United States Patent Office 3,686,111
Patented Aug. 22, 1972

3,686,111
NON-AQUEOUS POLYMERIC
PSEUDO-DISPERSION
Joseph M. Makhlouf, Mars, and Samuel Porter, Jr.,
Tarentum, Pa., assignors to PPG Industries, Inc., Pittsburgh, Pa.
No Drawing. Filed June 22, 1970, Ser. No. 48,510
Int. Cl. C08f 45/28, 47/20; C08j 1/46
U.S. Cl. 260—31.2
12 Claims

ABSTRACT OF THE DISCLOSURE

A non-aqueous pseudo-dispersion of polymeric particles is formed by polymerizing at least one ethylenically unsaturated monomer in a dispersing liquid of aliphatic hydrocarbon and an active solvent for the polymer in the presence of a polymerizable ethylenically unsaturated carboxylic acid, an imine, and a dispersion stabilizer which is a branched copolymer having two types of polymeric components of which one type is solvated by the dispersing liquid and the other type is an anchor polymer of different polarity to the first type and being relatively non-solvatable by the dispersing liquid and being capable of being anchored to the polymerized particles of the ethylenically unsaturated monomer and said anchor polymer containing pendant groups capable of copolymerizing with ethylenically unsaturated monomers. The resulting polymer is stable upon the addition of large amounts of active or coalescing solvents.

In addition to the importance of this polymer as a protective coating, it is an excellent dispersant for the grinding of pigments and especially carbon black pigments.

---

In the formation of paint compositions, an important factor is the introduction of the pigments to the coating composition. Pigments are ground in a dispersing agent and then inserted into the coating composition to give the coating composition the proper color, opacity, and consistency. The grinding of the pigment and dispersing of the pigment in the coating composition poses a problem for most paint compositions and especially for non-aqueous acrylic polymer dispersions which may not be compatible with or readily wet pigmented surfaces.

To satisfactorily pigment these acrylic dispersion coating compositions in order to achieve paint films of high gloss, reproducible color and opacity by the use of reasonably short grinding times has, until this time, been an unachievable goal. One particular problem involved is that the continuous phase of the acrylic dispersion contains principally aliphatic hydrocarbons which have low pigment dispersing power. It is also extremely difficult to find a dispersing agent for pigments which will be compatible with the acrylic polymers in the acrylic dispersion. Thus, a serious drawback to the use of acrylic dispersions as paint compositions is the problem of obtaining a pigment dispersant which is highly compatible with the acrylic polymer, is soluble in both aliphatic hydrocarbon and plasticizer, and also requires only a short grinding time to produce stable pigment dispersions.

For some purposes, satisfactory dispersions or solvent solutions of acrylic polymers may be attained with virtually any pigment and any desired vehicle. However, the commercial acceptance of compositions for some applications, automobile finishes, being an example, require properties in the applied coating which makes it necessary to have very finely and uniformly dispersed pigments, free from agglomerates. Long grinding times and tedious techniques thus become necessary in many cases. This is especially true in black finishes (i.e., where the pigment comprises carbon black) where "jetness" of the black finish is considered highly desirable.

The prior art dispersants for the grinding of carbon black pigment and other pigments have been either of the solvent solution type or of the dispersion type. The solution type is formed by polymerizing an acrylic monomer or monomers in a solvent for the polymer produced and the resulting polymer is in solution. The dispersion type is formed by polymerizing the acrylic monomer or monomers in a non-solvent for the acrylic polymer formed and in the presence of a dispersion stabilizers so that the resulting polymer is dispersed in a non-solvent.

It has been now discovered that the dispersing of carbon black pigment in particular and pigments in general is greatly and unexpectedly facilitated by dispersing the pigment in a pseudo-dispersion comprising particles of acrylic polymer in aliphatic hydrocarbon and active solvent for said polymer and an imine-modified polymerized ethylenically unsaturated carboxylic acid wherein the pseudo-dispersion contains a dispersion stabilizer of a branched copolymer having two types of polymeric segments of which one segment is solvated by the dispersing liquid and non-associated with polymerized particles of the polymerizable monomer, and the other segment is an anchor polymer of different polarity to the first segment and being relatively non-solvatable by the dispersing liquid and associated with polymerized particles of the polymerizable monomer and said anchor polymer contains ethylenic unsaturation capable of copolymerizing with ethylenically unsaturated monomers, wherein the anchor portion of the dispersion stabilizer is anchored to the polymerized acrylic particles. By using such a vehicle as the above dispersing medium, the time required for satisfactory dispersion of pigments in general and particularly carbon black is greatly reduced and coatings produced from compositions pigmented in this manner have improved appearance and excellent overall properties. These advantages are especially valuable with acrylic polymer coating compositions.

As mentioned, the invention is particularly applicable to pigmentation with carbon black but other pigments are also advantageously dispersed by this method. These include, for example, titanium dioxide, phthalocyanine blue, phthalocyanine green, red iron oxide, transparent red iron oxide, indo red, indo yellow molybdenite orange, monastral violet, ultra marine blue, cadmium red, and others.

The pseudo-dispersion in which the pigments are dispersed contains acrylic polymer particles, an active solvent for said polymer particles, an aliphatic hydrocarbon nonsolvent, imine-modified carboxylic acid, and a specific dispersion stabilizer.

In general, the process for making dispersions of acrylic polymers in organic solvents is by dispersion polymerizing acrylic monomer in an organic liquid in which it is soluble, but in which the resulting polymer is insoluble and forms disperse polymer particles. The reaction is carried out in the presence of a stabilizer having in its molecule (i) a constituent which becomes associated with the disperse polymer particles and (ii) a constituent having a pendant chain-like structure which is solvated by the organic liquid and provides a stabilizing sheath around the polymer particles.

The process for preparing solutions of acrylic polymers is simply by polymerizing the acrylic monomer or monomers in an active solvent for the polymer.

The novel process for preparing the dispersant of this invention is to polymerize an acrylic monomer or monomers in the presence of an imine and a polymerizable carboxylic acid which will react with the imine and a particular dispersion stabilizer in both an aliphatic hydrocarbon and an active solvent for the acrylic polymer. The resulting pigment dispersant is neither a solvent solution or a dispersion but a pseudo-dispersion.

By "pseudo-dispersion," it is meant that the composition has some properties of a solution such as high viscosity for grinding purposes yet it can be easily formed into a dispersion by the addition of non-active solvents. The acrylic polymer particles are, however, not truly in solution. The acrylic polymer particles in the pseudo-dispersion are not coalesced as in solution polymers and not fully discrete from one another as in true dispersions. These particles are only partially coalesced. In the pseudo-dispersion of this invention, the turbidity is much greater than that of a solution polymer of the same general composition yet is much lower than that of a dispersion polymer of the same general composition.

The preferred method of forming the pseudo-dispersion is by heating the active solvent and then adding the acrylic monomer, aliphatic hydrocarbon, dispersion stabilizer, imine, and carboxylic acid and free-radical initiator over a period of time. However, the materials may all be added at the same time or at a different time during the polymerization.

The polymerizable acrylic monomer or monomers which are polymerized in the process of this invention may be any ethylenically unsaturated monomer such as methyl methacrylate, ethyl acrylate, styrene, butyl acrylate, 2-hydroxy ethyl acrylate and methacrylate, 2-hydroxypropyl acrylate and methacrylate, 2-ethyl hexyl acrylate and methacrylate, acrylonitrile, acrylamide, acrylic acid, methacrylic acid, vinyl toluene, and many others. A more complete description of these monomers may be found in U.S. Pat. 3,037,963. A particularly preferred ethylenically unsaturated monomer to be polymerized is methyl methacrylate or co-monomers of methyl methacrylate and other acrylates.

Examples of non-active solvents useful herein are liquid aliphatic hydrocarbons such as pentane, hexane, heptane, octane, mixtures of the above, and the like, naphthas, such as VM&P naphtha, and the like.

The active solvent used along with the aliphatic hydrocarbon must be one which is capable of dissolving the acrylic polymer. Solvents which are active with respect to acrylic polymers are well known and some examples of conventional active solvents are Cellosolve acetate (ethylene glycol monoethyl ether acetate), 2,2,4-trimethyl-1,3-pentanediol monoisobutyrate (Texanol), butyl Carbitol acetate (diethylene glycol monobutyl ether acetate), butyl acetate, acetone, toluene, methyl ethyl ketone, methyl isobutyl ketone, methyl isoamyl ketone, and the like.

The amounts of active solvent and liquid aliphatic hydrocarbon must be balanced properly for the pseudo-dispersion to be produced. The weight ratio of aliphatic hydrocarbon to active solvent is from about 1:1 to about 1:5. Using more aliphatic hydrocarbon causes inversion to a dispersion which produces grinding problems while using more active solvent causes solution of polymer particles to obtain a solution polymer which would also produce like grinding problems.

The polymerizable ethylenically unsaturated carboxylic acid may be any acidic acrylic compound such as acrylic acid, methacrylic acid, crotonic acid, 3-butenoic acid itaconic acid, and the like. This acid reacts with the imine component.

The imine, in turn, may be any imine-containing compound which will react with the carboxylic acid.

Any imine-containing compound which will react with a carboxylic acid may be used. Generally the imine-containing compounds are the alkylene imines and substituted alkylene imines. The preferred class of such imines are those of the formula:

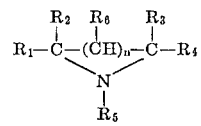

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl or the like, or aralkyl, such as benzyl, phenethyl, or the like. $R_6$ in the above formula is hydrogen or a lower alkyl radical usually having not more than about 6 carbon atoms, and $n$ is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkyleneimines (whether or not within the above formula) does not depend upon the particular nature of any of the substituents, but rather the imine linkage; thus, beneficial results are obtained with interpolymers modified by any of those compounds within the above class.

A number of specific examples of alkyleneimines within the class described are as follows:

Ethylenimine (aziridine)
1-2-propylenimine (2-methyl aziridine)
1-3-propylenimine (azetidine)
1,2-dodecylenimine (2-decyl aziridine)
1,1-dimethyl ethylenimine (2,2-dimethyl aziridine)
Phenyl ethylenimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl aziridine)
3-chloropropyl ethylenimine (2-(3-chloropropyl)aziridine)
p-Chlorophenyl ethylenimine (2-(4-chlorophenyl) aziridine)
Methoxyethyl ethylenimine (2-(2-methoxyethyl) aziridine)
Dodecyl aziridinyl formate (dodecyl 1-aziridinyl carboxylate)
Carbethoxyethyl ethylenimine (2-(3-carbethoxyethyl) aziridine)
N-ethyl ethylenimine (1-ethyl aziridine)
N-butyl ethylenimine (1-butyl aziridine)
N-(2-aminoethyl)ethylenimine (1-(2-aminoethyl) aziridine)

N-(phenethyl)ethylenimine (1-(2-phenylethyl)aziridine)
N-(2-hydroxyethyl)ethylenimine (1-(2-hydroxyethyl) aziridine)
N-(cyanoethyl) ethylenimine (1-cyanoethyl aziridine)
N-phenyl ethylenimine (1-phenyl aziridine)
N-tolyl ethylenimine (1-(2-methylphenyl)aziridine)
N-(p-chlorophenyl)ethylenimine (1-(4-chlorophenyl) aziridine)

Because of their availability and because they have been found to be among the most effective, the preferred imines are alkyleneimines and substituted alkylenimines having 2 to 4 carbon atoms, and especially ethylenimine, 1,2-propylenimine, and N-hydroxyethyl ethylenimine.

The dispersion stabilizer used in this invention is a branched copolymer comprising two types of polymer components of which one segment is solvated by the aliphatic hydrocarbon solvent and not associated wtih polymerized particles of the polymerizable ethylenically unsaturated monomer and the second type is an anchor polymer of different polarity to the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally the solvatable segment (A) is a monofunctional polymeric material of molecular weight of about 300 to about 3,000. These polymers may be made, for example, by condensation reaction producing a polyester or polyether. Preferably the polyester reaction is a simple one involving a mono-hydroxylic mono-carboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacids with diols. For example, 1,12-decanediol may be reacted with sebacic acid or its diacid chloride to form a component solvatable by aliphatic hydrocarbons.

The preferred polymeric segment (A) of the dispersion stabilizer is formed by reacting poly-12-hydroxy stearic acid with glycidyl methacrylate.

The second polymeric segment (B) of the dispersion stabilizer is of different polarity to the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) of which extends outwardly from the surface of the particles provides a solvated barrier which sterically stabilizes the polymerized articles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylates and glycidyl methacrylate. These copolymers are further reacted with polymerizable ethylenically unsaturated acids such as acrylic acid, methacrylic acid, 3-butenoic acid, crotonic acid, itaconic acid, and the like, which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually separated entities, the segment (A) being attached to the backbone of the graft copolymer and the segment (B) being carried in or on the backbone. However, in some cases the segments (A) and (B) may be attached one to the other. For example, segment (A) may be attached to segment (B) by ionized ionic linkages.

The imine component which reacts with the carboxylic acid component may be added before, during, or after the polymerization of the acrylic monomer. While often the imine reaction is carried out after the polymer has been produced, it has been found that some saving of time without any sacrifice in properties is achieved by carrying out the reaction with imine concurrently with the interpolymerization reaction. In this embodiment, the imine is added to the polymerization mixture at any point prior to the completion of the polymerization reaction. Preferably, the imine is added after the monomers, but before the polymerization is substantially advanced.

The polymerization reaction is otherwise carried out in conventional manner, utilizing heat and/or catalysts and varying solvents and techniques. Generally, a free-radical catalyst, such as cumene hydroperoxide, benzoyl peroxide or similar peroxygen compound, or an azo compound, is employed. When the polymerization reaction and the reaction with imine are conducted concurrently as described above, azo compounds, and especially alpha, alpha-azobis(isobutyronitrile), are preferred as the catalyst.

The dispersant preferably contains from about 1 percent to about 40 percent by weight of the dispersion stabilizer based on the weight of the ethylenically unsaturated monomer from about 0.2 percent to about 6 percent by weight of the ethylenically unsaturated carboxylic acid based on the ethylenically unsaturated monomer, from about 0.2 percent to about 6 percent by weight of imine based on the ethylenically unsaturated monomer and the aliphatic hydrocarbon solvent, preferably comprises from about 10 percent to about 50 percent of the entire solvent composition and the active solvent preferably comprises from about 50 percent to about 90 percent by weight of the entire solvent composition. The pseudo-dispersion, which yields the best properties for dispersing pigment contains about 6.6 percent by weight of the dispersion stabilizer based on the ethylenically unsaturated monomer, about 0.75 percent by weight of the carboxylic acid and about 0.75 percent by weight of the imine, both based on the ethylenically unsaturated monomer and the entire pseudo-dispersion containing about 19 percent by weight of the aliphatic hydrocarbon solvent and about 42 percent by weight of the active solvent. The composition may contain from about 20 percent solids content to about 60 percent solids content.

The pigment is ground in the novel dispersant in the conventional manner such as in a steel ball mill. A wide range of pigment to dispersant ratios may be used, but the preferable ratios of pigment to dispersant are from about 5:1 to about 1:3.

If desired, the pigment paste resulting from the above method may be used to pigment any coating composition, but more preferably is used for acrylic polymer dispersion compositions. Any conventional acrylic polymer dispersion composition may be stabilized by the addition of the above pigment paste. The pigment paste may also be dispersed in the dispersant and used as a coating composition per se if desired.

When using the paste formed from the pigment dispersant and pigment in a paint composition, the final paint composition (acrylic polymer dispersion) may be adapted to be modified by the incorporation of drying oil, waxes (e.g., hydrocarbon, chlorinated hydrocarbon, and ester types), pigments, filler dyes, as well as plasticizers and polymeric or resinous materials which are soluble in the hydrocarbon liquid vehicle, including fatty-acid modified shellac, gums, natural resins, waxes, asphalt, bitumen, coal tar, cumarone-indene resins, epoxidized fatty oils, epoxy resins, organic solvent-soluble alkylated methylolated aminoplast resins including the condensates of formaldehyde with urea, melamine, thiourea, benzoguanamine, ethylene urea, alkylated with an alcohol having 2 to 6 carbon atoms such as n-butanol. Among other materials that can be incorporated are the alkyds, organic solvent-soluble vinyl and acrylic resins with or without plasticizers, including plastisols obtained from polyvinyl chloride or copolymers of vinyl chloride and plasticizers therefor.

Coating compositions utilizing the pigment dispersant and pigment paste prepared therefrom may be used as coatings for all types of substrates and may be applied using any conventional coating method such as dip coating, roll coatings, spraying, etc. They are useful as coatings for a variety of substrates such as textile fabrics, paper, paperboards, leather, wood, metals, ceramics, concrete, bricks, stone, plaster, vinyl materials, linoleum, asphalt tile, and asbestos products. They are especially useful as topcoats for automotive products. Automotive bodies spray coated with these compositions have glossy coatings which are quite durable.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE 1

A pigment dispersant was prepared in the following manner:

A reactor was charged with 1000 grams of toluene and heated at 109° C. for 15 minutes. At that time, 1114 grams of methyl methacrylate, 282 grams of 2-ethylhexyl acrylate, 11.2 grams of methacrylic acid, 5.1 grams of azobis (isobutyronitrile), 620 grams of heptane and 274 grams of a dispersion stabilizer prepared by reacting 50 parts of the reaction product of 9 parts of polyhydroxy stearic acid and 1 part of glycidyl methacrylate with 45 parts of methyl methacrylate and 5 parts of glycidyl methacrylate and reacting the product of that reaction with methacrylic acid, were added over a 2-hour period at 100° C. After 2 hours, 11.5 cubic centimeters of 2-hydroxyethyl ethylene imine, 3.4 grams of azobis(isobutyronitrile) in 225 grams of methyl ethyl ketone were added dropwise over a 2-hour period at 99° C. The composition was cooled and an additional 225 grams of methyl ethyl ketone were added.

The resulting pseudo-dispersion had a solids content of 37.3 percent, a Gardner-Holdt viscosity of V+ and an acid value of 0.9.

EXAMPLE 2

A jet black pigment paste was formed by adding 75 parts of high color carbon black pigment (Cabot 607) to 349 parts of the dispersant of Example 1 and 46 parts of toluene and ground in a steel ball mill for 21 hours.

The pigment paste had fine color and ground easily to a uniform paste.

EXAMPLE 3

A blue pigment paste was formed by adding 71 parts of phthalo blue pigment to 78 parts of the pseudo-dispersion of Example 1 and 279 parts of methyl ethyl ketone and ground in a steel ball mill for 19 hours.

The pigment paste had fine color and ground easily to a uniform paste.

EXAMPLE 4

A white paste was formed by adding 600 parts of white pigment to 317 parts of the dispersant of Example 1 and 83 parts of toluene and ground in a steel ball mill for 19 hours.

The pigment paste had fine coor and ground easily to a uniform paste.

According to the provisions of the patent statutes, there is described above the invention and what are now considered to be its best embodiments. However, within the scope of the appended claims, it is to be understood that the invention can be practiced otherwise than as specifically described.

We claim:

1. A method of producing a non-aqueous pseudo-dispersion of an acrylic polymer comprising polymerizing at least one ethylenically unsaturated monomer in a dispersing liquid of aliphatic hydrocarbon solvent in the presence of an active solvent for the polymerized monomer, wherein the ratio of active solvent to aliphatic hydrocarbon is from about 1:1 to about 5:1, from about 0.2 percent to about 6 percent by weight of a polymerizable ethylenically unsaturated acid, based on the ethylenically unsaturated monomer, from about 0.2 to about 6 percent by weight of an imine having the formula:

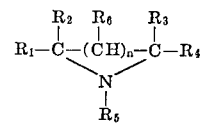

wherein $R_1$, $R_2$, $R_3$, $R_4$ and $R_5$ are each selected from the group consisting of hydrogen, alkyl, aryl, alkaryl, and aralkyl groups and $R_6$ is selected from the group consisting of hydrogen or alkyl having not more than about 6 carbon atoms and $n$ is an integer from 0 to 1 based on the ethylenically unsaturated monomer, and from about 1 percent to about 40 percent by weight, based on the ethylenically unsaturated monomer, of a dispersion stabilizer comprising a branched copolymer containing two polymeric segments of which one segment is solvated by the dispersing liquid and the second segment is an anchor polymer of different polarity to the first segment and is relatively non-solvated by the dispersing liquid and is capable of anchoring with the polymerized particles of the ethylenically unsaturated monomer, said anchor polymer containing pendant groups which are copolymerizable with ethylenically unsaturated monomers.

2. The method of claim 1 wherein the acrylic polymer formed is polymethyl methacrylate.

3. The method of claim 1 wherein the polymerizable, ethylenically unsaturated carboxylic acid is methacrylic acid.

4. The method of claim 1 wheerin the imine is N-2-hydroxyethyl ethylene imine.

5. The method of claim 1 wherein the dispersion stabilizer is formed by graft copolymerizing (A) the reaction product of glycidyl methacrylate and poly-12-hydroxy stearic acid and (B) the reaction product of methyl methacrylate, glycidyl methacrylate and the copolymer product containing pendant epoxy groups is reacted with methacrylate acid.

6. A pseudo-dispersion of particles of acrylic polymer of ethylenically unsaturated monomers in a dispersing liquid of aliphatic hydrocarbon solvent and active solvent for said polymer wherein the ratio of active solvent to aliphatic hydrocarbon is from 1:1 to about 5:1, from about 0.2 to about 6 percent by weight based on the ethylenically unsaturated monomer of a polymerizable ethylenically unsaturated carboxylic acid from about 0.2 to about 6 percent by weight based on the ethylenically unsaturated monomer, of an imine having the formula:

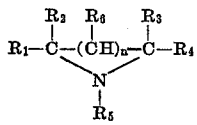

wherein $R_1$, $R_2$, $R_3$, $R_4$, and $R_5$ are each selected from the group consisting of hydrogen, alkyl, aryl, alkaryl, and aralkyl groups and $R_6$ is selected from the group consisting of hydrogen or alkyl having not more than about 6 carbon atoms and $n$ is an integer from 0 to 1 the pseudo-dispersion containing from about one to about 40 percent by weight based on the ethylenically unsaturated monomer of a dispersion stabilizer comprising a branched copolymer containing two polymeric segments of which one segment is solvated by the dispersing liquid and the second segment is an anchor polymer of different polarity to the first segment and is relatively non-solvated by the dispersing liquid and is capable of anchoring with polymerized particles of the ethylenically unsaturated monomers, said anchor polymer containing pendant groups which are copolymerizable with ethylenically unsautrated monomers, wherein the anchor portion of the dispersion stabilizer is anchored to the polymerized acrylic particles.

7. The composition of claim 6 wherein the polymerized acrylic monomer is methyl methacrylate.

8. The composition of claim 6 wherein the polymerized acrylic monomer is a comonomer of methyl methacrylate and another acrylate monomer.

9. The composition of claim 6 wherein the ethylenically unsaturated carboxylic acid is methacrylic acid.

10. The composition of claim 6 wherein the dispersion stabilizer is formed by graft co-polymerizing (A) the reaction product of glycidyl methacrylate and poly-12-hydroxy stearic acid and (B) the reaction product of methyl methacrylate, glycidyl methacrylate, and the copolymer product containing pendant epoxy groups is reacted with methacrylic acid.

11. The method of grinding pigment for incorporation into paint compositions comprising adding pigment material to a pigment dispersant comprising the dispersion of claim 6 and grinding said pigment in said pigment dispersant to form a pigment paste.

12. The method of claim 11 wherein said pigment is jet black pigment.

References Cited
UNITED STATES PATENTS

| | | | |
|---|---|---|---|
| 3,325,443 | 6/1967 | Christenson et al. | 260—41 |
| 3,166,524 | 1/1965 | Schmidle et al. | 260—23 |
| 3,505,268 | 4/1970 | Backhouse et al. | 260—31.2 |
| 2,636,872 | 4/1953 | James et al. | 260—33.6 |
| 3,433,753 | 3/1969 | Farkas et al. | 260—22 |
| 3,446,769 | 5/1969 | Opipari | 260—31.4 |
| 3,514,500 | 5/1970 | Osmond et al. | 260—874 |

MORRIS LIEBMAN, Primary Examiner

H. H. FLETCHER, Assistant Examiner

U.S. Cl. X.R.

260—31.4 R, 31.6, 32.8 N, 33.6 UA, 34.2, 41 R, 41 B, 41 C